United States Patent [19]

Koziol

[11] 3,793,486

[45] Feb. 19, 1974

[54] DATA SET SYSTEM EMPLOYING ACTIVE FILTERS AND MULTIVIBRATOR TIMING

[76] Inventor: Leo B. Koziol, 9210 Adams, Livonia, Mich. 48150

[22] Filed: Jan. 22, 1971

[21] Appl. No.: 109,056

Related U.S. Application Data

[63] Continuation-in-part of Ser. Nos. 782,962, Dec. 11, 1968, abandoned, and Ser. No. 782,963, Dec. 11, 1968, abandoned.

[52] U.S. Cl. ................ 179/2 DP, 178/66 R, 325/30, 325/320

[51] Int. Cl. .......................................... H04m 11/06

[58] Field of Search.... 179/2 DP, 3, 4; 325/30, 163, 325/320; 178/58, 66; 331/113 R, 144

[56] References Cited

UNITED STATES PATENTS

| | | | |
|---|---|---|---|
| 3,627,949 | 12/1971 | Krecic | 179/2 DP |
| 3,517,129 | 6/1970 | Talcott | 179/2 DP |
| 3,466,399 | 9/1969 | Dias | 179/15 BT |
| 3,204,200 | 8/1965 | White | 331/113 |
| 3,577,201 | 5/1971 | Quatse | 179/2 DP |

*Primary Examiner*—Kathleen H. Claffy
*Assistant Examiner*—Thomas D'Amico
*Attorney, Agent, or Firm*—Ralzemond B. Parker; Edwin W. Uren; Kenneth L. Miller

[57] ABSTRACT

A data set capable of converting binary encoded data signals into shift keying modulated signals for transmission over telephone lines. The timing element of the data set is a voltage controlled oscillator which is responsive to the binary encoded input information. The oscillator is adapted to operate at one frequency for the mark or binary one level of the input information and to operate at either one of two higher frequencies for the space or binary zero level of input information. An oscillator control means is responsive to the desired bandwidth and is operable to supply either one of two control voltages to the oscillator to generate either of said space frequencies. Operational amplifiers allow elimination of the conventional inductive components in both high and low pass filters thereby making each section an active filter section instead of being a passive filter. Each active filter section provides gain control which is not available in passive sections.

7 Claims, 17 Drawing Figures

DATA SET SYSTEM EMPLOYING ACTIVE FILTERS AND MULTIVIBRATOR TIMING

CROSS-REFERENCE TO RELATED APPLICATIONS

This application is a combined continuation-in-part of my copending applications for U.S. Pat. Ser. Nos. 782,962 and 782,963, both filed on Dec. 11, 1968, now abandoned.

SUMMARY OF THE INVENTION

An important object of the invention is to provide an improved data set having the capability of transmitting and receiving FM signals over telephone networks. An improved provision is the use in both the transmitting and receiving sections of the system of inductorless multiple feedback active RC networks each having an operational amplifier as the active element therein. In the transmitter, the high gain of such an active RC filter is utilized for eliminating odd harmonic frequencies of the square wave signal which is converted into a frequency modulated signal for transmission. In the receiver, such active RC filters additionally provide elimination of all unwanted signal interference in low pass and band pass filters.

Another important object of the invention is to provide an improved timing provision for the multivibrator in the system including a unidirectional transfer member electrically connected in parallel circuit to the base-emitter junction of a transistor in such a manner as to shunt the voltage discharge of the timing capacitor from the transistor base to the transistor emitter. This timing provision further includes a unidirectional current conducting member electrically connected in series circuit between the transistor emitter and a source of potential for conducting the current from the transistor emitter and for blocking further transfer of the voltage discharge of the timing capacitor to the source of potential thus providing a maximum time period for a given set of RC values in the multivibrator.

The above listed objects, advantages and other meritorious aspects of the invention will be fully explained in the following detailed description. For a more complete understanding of the invention reference may be had to the following detailed description in conjunction with the drawings.

DETAILED DESCRIPTION

SYSTEM DESCRIPTION

Figure 1:
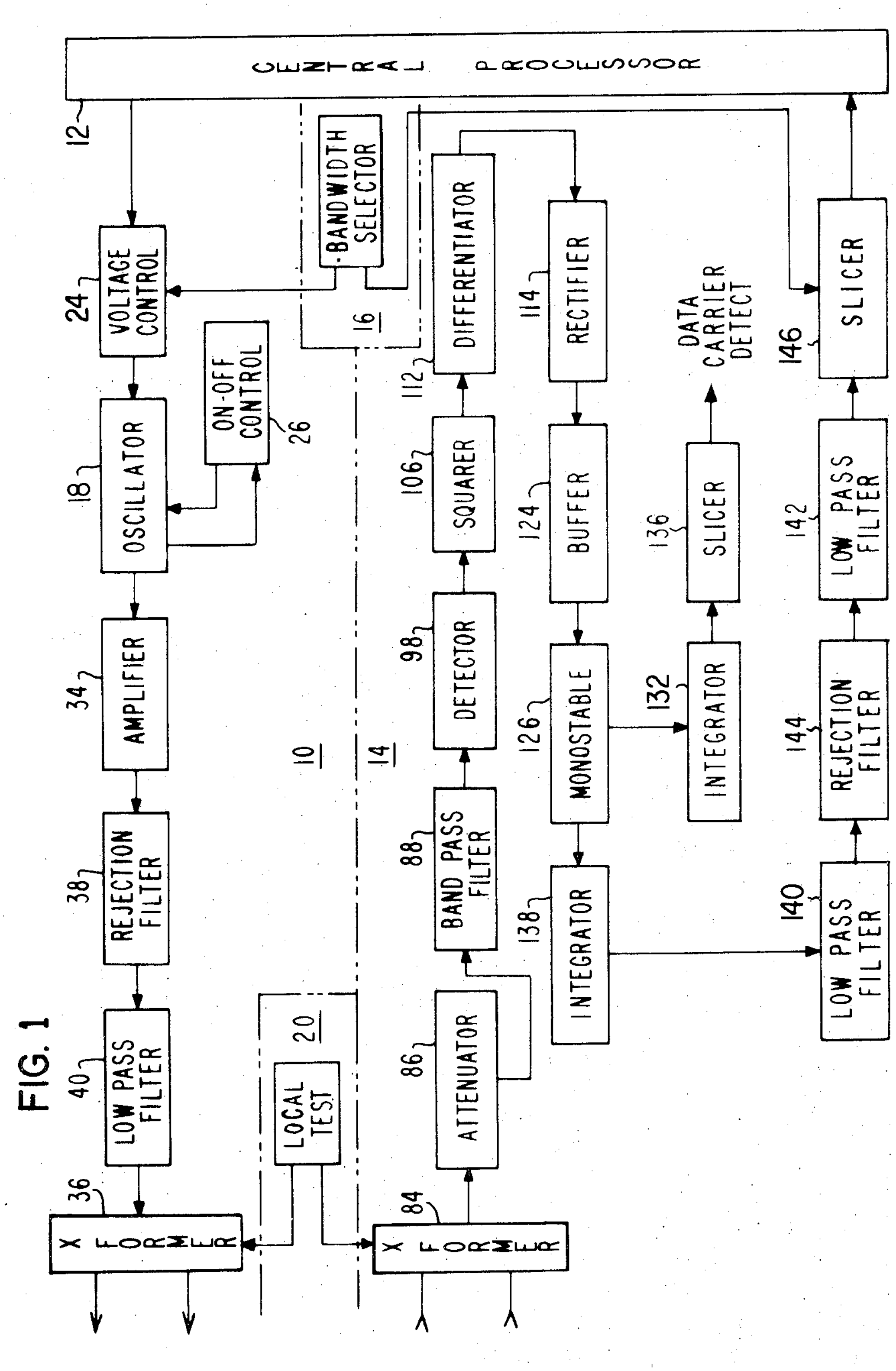
FIG. 1 is a block diagrammatic illustration of the data set embodying the present invention.

A full complex data set embodying the invention is illustrated in FIG. 1. The data set may, for the purpose of description, be divided into four sections. The first section 10 is the transmitter having the function of converting direct current level binary encode signals from the central processor 12 into a first or second frequency, capable of being transmitted over a telephone network.

The second section 14 is the receiver having the function of receiving from the telephone network frequency modulated signals similar to the above mentioned transmitted signals and converting these signals to direct current level binary encoded signals. The d.c. level signals may then be supplied to a central processor 12 or similar machine.

The third section 16 is the bandwidth selection section controlling the maximum frequency of the oscillator 18 according to the condition of the transmission network. This selects a first frequency bandwidth for 0 to 600 baud or a second frequency bandwidth for 0 to 1200 baud. As will be described hereinafter, it also changes the threshold voltage on a receiver slicer to accommodate the expanded bandwidth.

The fourth section 20 is the local test section having the capability of checking or testing the data set without the set being connected to the telephone network.

TRANSMITTER SECTION

As shown in FIG. 1, the transmitter section 10 is comprised of seven basic functional units. The signal 22 (FIG. 5) to be transmitted is received from the central processor 12 by the voltage control unit 24. This unit is responsive to the binary levels of the central processor output data 22 for regulating the oscillator 18. The frequency of the oscillator 18 varies directly with the magnitude of the voltage output of the voltage control unit 24.

Figure 2:
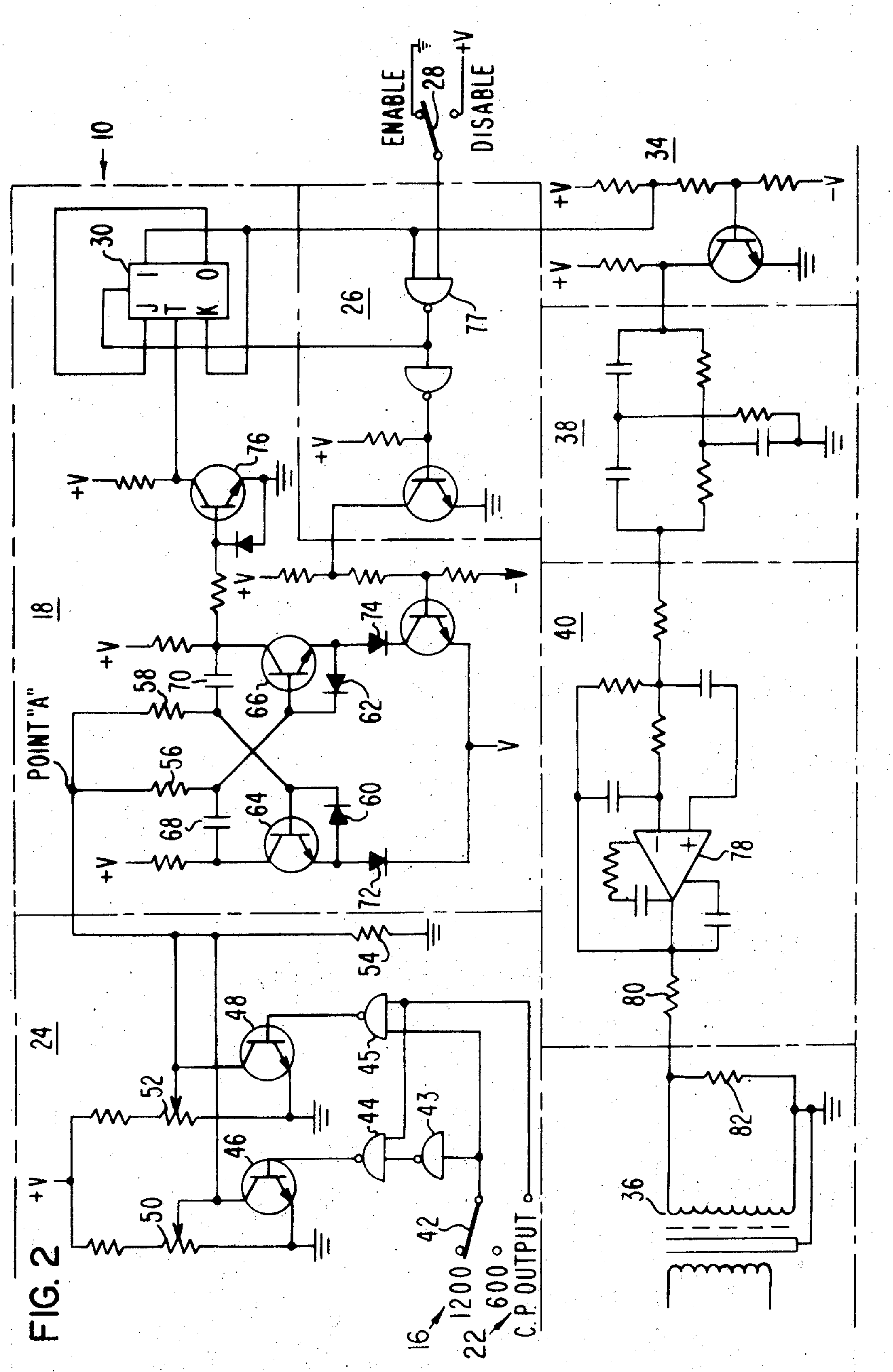
FIG. 2 is a circuit schematic of the transmitter section of the data set.
Figure 3:
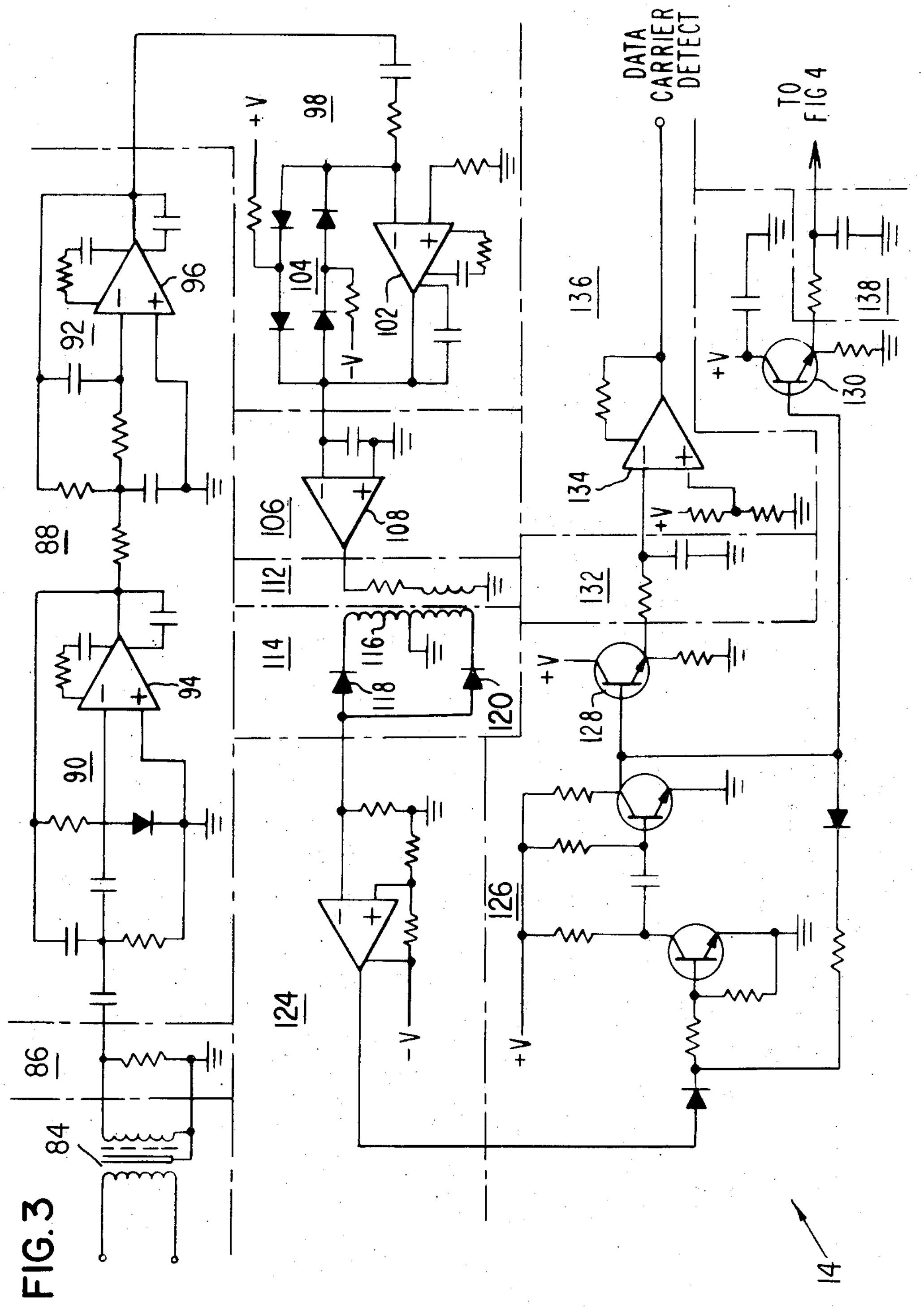
FIGS. 3 and 4 are circuit schematics of the receiver section of the data set.

An on-off unit 26 controls the oscillator and is responsive to an operational signal which is represented by the enable-disable switch 28 of FIG. 2. Means is provided for dividing the frequency of the oscillator output by two in order to provide improved phase control of the transmission signal as well as to eliminate the second harmonic frequency component of the oscillator signal thereby relaxing the tolerance requirements of the succeeding filter sections. This is accomplished by a J-K flip flop 30 electrically connected to the oscillator output and in turn its resultant signal 32 (FIG. 6) is then amplified in the amplifier section 34. The two functions of the amplifier section are to amplify and control the application of direct current voltage to the transformer 36 and to increase the rise and fall times of the square wave signal supplied to a rejection filter 38.

The next two filter sections receive the square wave signal from the amplifier 34 and generate a sine wave FM signal for transmission. The filter 38 rejects the third harmonic frequency component of the mark signal. A low pass active filter 40 having a cutoff frequency of 2400Hz limits the signal spectrum applied to the transmission line and maximizes the power of the transmitted fundamental frequency.

FIG. 2 illustrates the circuit schematic of the transmitter section 10. The bandwidth selection section 16, which is represented by a switch 42, supplies a positive voltage potential to the voltage control section 24 for the first frequency bandwidth for a rate up to 1200 baud and a ground voltage potential for the second frequency bandwidth for a rate up to 600 baud. This signal is gated in the NAND gates 43, 44 and 45 with the central processor (C.P.) output data 22 to control the conduction of the first and second control transistors 46 and 48. By convention, the mark signal from the central processor is at a negative voltage potential between −3 and −25 and the space signal is at a positive voltage potential between +3 and +25; therefore the conduction of the two control transistors 46 and 48 is according to the following table:

| Data | Rate (Baud) | First Transistor 46 | Second Transistor 48 | Voltage at Point A (FIG. 2) |
|---|---|---|---|---|
| Mark | 600 | ON | ON | LOW |
| Mark 1200 | ON | | ON | LOW |
| Space | 600 | OFF | ON | MEDIUM |
| Space | 1200 | ON | OFF | HIGH |

The two variable resistors 50 and 52 in the collector circuits of the two control transistors 46 and 48 are adjusted to cooperate with a fixed resistor 54 in a wye configuration to provide a predetermined voltage potential according to data to be transmitted to Point A of the timing resistors 56 and 58 in the oscillator 18. In a preferred embodiment of the invention, both control transistors 46 and 48 are never off or non-conducting at the same time. Therefore, the voltage applied to the timing resistors 56 and 58 is one of three variations which is identified as low, intermediate, and high in the table above.

The oscillator 18 may be similar to a conventional astable multivibrator but with the added capability of controlling the frequency of oscillation as previously stated. Additionally, there is provided a diode, 60 or 62, between the base and emitter of each of the oscillator transistors 64 and 66 to protect the base emitter junction of each transistor from being damaged by high frequency inverse voltage pulses. These two diodes 60 and 62 are connected by their cathodes to the base leads of the transistors 64 and 66 and by their anodes to the emitter leads of the transistors. In this manner, the diodes 60 and 62 are reversed biased during conduction of the transistors but are forward biased during the discharge of the base timing capacitors 68 and 70 at which time a high frequency voltage pulse is generated. This is bypassed around the non-conducting transistor 64 or 66 by the base emitter diode and appears across the emitter diode 72 and 74 of its respective transistor. At this time, the emitter diode is reversed biased and the inverse voltage discharge pulse is not clamped to $-V_3$. This is necessary to maintain the required frequency response of the oscillator without increasing the RC time constant to a value which would require physically larger components.

The oscillator's output signal is amplified by the transistor amplifier 76 to drive the oscillator flip flop 30. The flip flop provides a 50 percent duty cycle to minimize the generation of the even harmonics of the fundamental frequency. The flip flop 30 cooperates with the NAND gate 77 in the control unit 26 to provide the improved phase control of the transmission signal. At the end of transmission, the switch 28 is switched to disable applying a plus voltage level to one input of the NAND gate. The second input to the gate is coupled to the "one" output of the flip flop 30. When both inputs are plus, the output signal of the NAND gate turns the oscillator off and locks the "one" output of the flip flop 30 in the "one" state. This assures that the transmission is turned off on the proper signal or phase level thereby preventing the generation of spurious high frequency transients on the transmission line.

The amplifier 34 is a limiting amplifier for removing the voltage from the transformer 36 when the oscillator 18 is turned off. The output from the limiting amplifier 34 is passed through the rejection filter 38 having a rejection frequency of 3900Hz for eliminating the third harmonic frequency component of the mark signal.

The low pass filter 40 is a controlled gain multiple feedback active RC network. The main element 78 in the active filter is the operational amplifier which replaces the inductive component normally associated with low pass filters. With the inclusion of the operational amplifier 78 not only the size, weight, and cost of the filter section are greatly reduced but an added benefit is the provision of gain control within the filter section. This gain control eliminates the prior art reqirement of employing an additional amplifier immediately preceding the transformer 36. The complete design criteria for this active filter may be found in the *Handbook of Operational Amplifier Active RC Networks* by Burr-Brown Research Corporation, a 1966 copyright publication.

The output of the low pass active filter 40 is supplied to the transformer 36 for delivery over the transmission lines. The series-parallel resistors 80 and 82 between the low pass active filter 40 and the transformer 36 provide impedance matching therebetween.

The transmitter section 10 has been shown to contain an operational amplifier as the active element in an RC filter 40 for controlling the frequency of a transmitted signal and a voltage controlled oscillator 18 for supplying the transmission frequencies. The provision of such a kind of active RC filter 40 for controlling the transmitted signal provides a final active stage of gain control immediately preceding the transformer 36 for coupling the signal 83 (FIG. 7) to the transmission lines.

RECEIVER STATION

As shown in FIG. 1, the receiver section 14 of the duplex data set is comprised of 16 basic functional units. The frequency modulated signal, similar to that illustrated for the transmitter section, is received from the telephone network by a transformer 84. The signal from the transformer is attenuated 86 to such a level as required by the data set. The attenuated signal is filtered in a band pass filter 88 to exclude the noise and other interference picked up by the telephone network. The band pass filter 88, in the preferred embodiment comprises two separate filter sections. The first filter section 90 is a multiple feedback high pass active RC filter having a cutoff frequency of 1300 Hz which is the mark frequency. The second filter 92 is a multiple feedback low pass active RC filter having a cutoff frequency of 2100Hz. The combined action of both filters 90 and 92 is to allow a band pass from 1300 to 2100Hz and to thereby limit the power of the unwanted signals. By the use of two individual filters to form the band pass, a lower Q for the filter section 88 is attainable. Also, with the band pass filter 88 comprising both an individual high and low pass filter section, a sharper roll off characteristic is obtained.

In a preferred embodiment of the invention, both of the filter sections 90 and 92 in the band pass filter 88 use an operational amplifier 94 and 96 as the active filter element instead of an inductor as a passive element. As hereinbefore stated, with the use of an operational amplifier 94 or 96, gain control is provided so that the output of the band pass filter 88 is at the required power levels and no additional amplifying stage is required.

The output of the band pass filter 88 is basically a sine wave within the frequency band of 1300 to 2100 Hz. This sine wave is supplied to zero crossing detector circuit 98 where the sine wave is converted into a series of square waves 100 (FIG. 8) coincident with each zero crossing. The main active element 102 in this circuit is an operational amplifier. The zero crossing detector is basically a relatively slow switcher so that the output pulses do not have fast rise and fall times. The full wave bridge feedback network 104 around the operational amplifier 102 in the detector circuit 98 insures that the output pulses do not exceed the voltage limits of the squarer circuit 106 input.

The somewhat rounded pulses from the detector circuit 98 are shaped in the squarer circuit 106. This circuit comprises an operational amplifier 108 connected as a fast switching amplifier which improves the rise and fall times of the square wave pulses from the detector circuit 98. At this point in the circuit, the frequency of the pulses is the same as the frequency of the input FM signal.

Figures 5, 6, 7, 8, 9, 10, 11, 12:
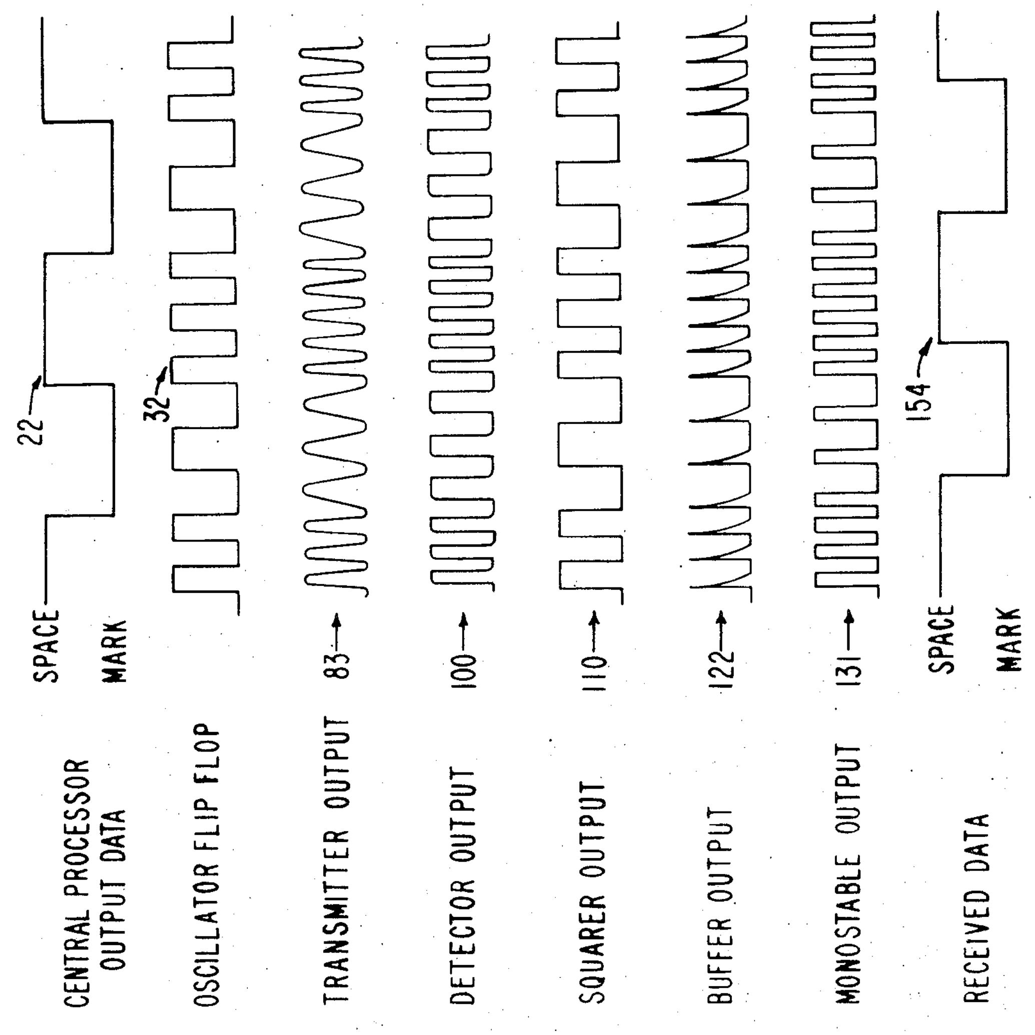
FIG. 5 through and including FIG. 12 are illustrations of the voltage signals taken at various points in the data set.

The output 110 of the squarer circuit 106, shown in FIG. 9 at half frequency for purpose of illustration, is then differentiated by a differentiator 112 to provide a series of differentiated pulses at twice the frequency of the received signal. The threshold is set to the voltage corresponding to the average value of the high and low frequencies and, of course, if the bandwidth is changed one would change the threshold voltage in order to correspond to the average value of the high and low frequencies. A series of positive and negative pulses are alternately generated from the square wave pulse train from the squarer circuit 106. The full wave rectifier circuit 114 comprising a secondary winding 116 which is center tapped and two rectifiers 118 and 120 function to rectify the differentiated pulses and to have all the pulses of the same voltage sense. In a preferred embodiment of the invention, the rectified pulses are all negative going and at twice the frequency of the FM signal received at the input transformer 84.

The rectified pulses are then power amplified and inverted 122 (FIG. 10) in an operational amplifier buffer 124 to provide enough drive to trigger the basic timing module in the receiver section. This timing module may be a standard monostable multivibrator 126 having two parallel output drivers, or it may be the improved multivibrator timing provision described hereinbelow.

With the two parallel output drivers 128 and 130 from the monostable multivibrator 126, two useful outputs are generated. The first output is the data carrier present signal which is indicative of a good transmission network. The output 131 (FIG. 11) from the multivibrator 126 is integrated at 132 to provide a ramp voltage signal which after a period of time switches the operational amplifier 134 output in the slicer circuit 136 from a plus voltage to a ground potential. In the preferred embodiment, the delay generated by the integrator 132 is 10 milliseconds. When the output of the operational amplifier 134 is a positive voltage, the data set is not receiving any carrier signal from the telephone lines; and when the output is ground potential, a carrier signal is being received.

Figure 4:
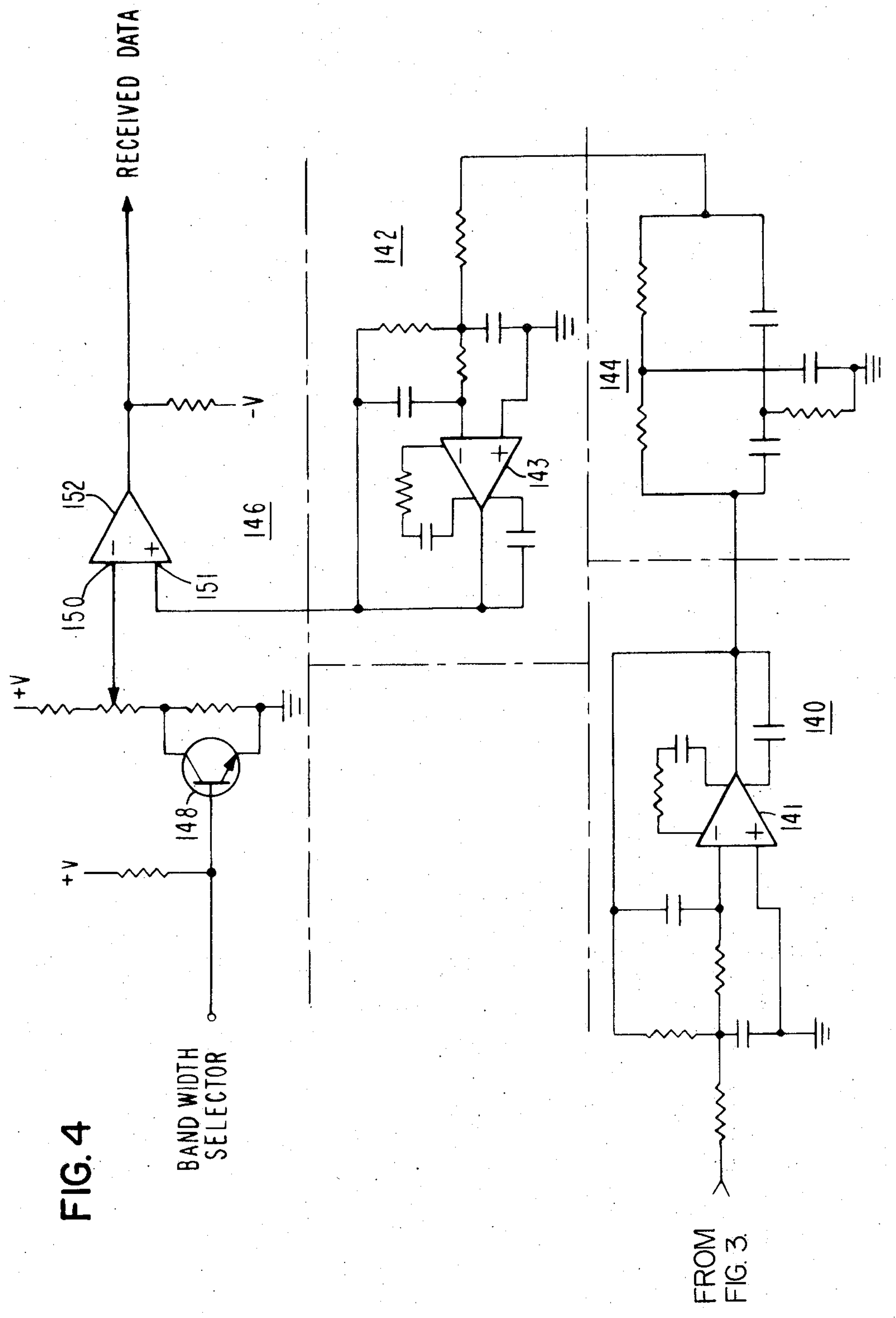

The second output 130 from the multivibrator 126 is also integrated at a much faster rate by the second integrator 138. The output of this integrator 138 is a basic direct current voltage level having a ramp signal superimposed thereon. This signal is then supplied to a filter section having a pair of inductorless multiple feed back low pass active RC filters 140 and 142 utilizing operational amplifiers 141 and 143 as the active elements on either side of a twin "T" rejection filter 144, see FIG. 4. The cutoff frequency of both low pass filters 140 and 142 is 1000Hz and the rejection frequency of the twin "T" filter 144 is 2600 Hz which is the second harmonic frequency component of the mark signal. The signals which are passed through these filters 140, 142 and 144 are the lower sideband signals of the input signal received at the transformer 84. The output of the first active low pass filter 140 has a slow slope due to the basic frequency of the monostable multivibrator 126. The frequency component of 2600Hz is then rejected in the rejection filter 144, to provide a better signal to the second active low pass filter 142.

The output of the second active low pass filter 142 is a d.c. voltage level directly proportional to frequency of input signal received from the transmission line. For a mark signal, the frequency is the lowest and therefore the d.c. voltage is the lowest. This is the normal operating state of the data set. When a spacing signal is received, the output from the second active low pass filter 142 is increased and the operational amplifier slicer circuit 146 produces a positive direct current voltage output. In the slicer circuit 146 the output is not inverted from the input as illustrated by the connection to the "+" or non-inverting input 151 of the operational amplifier 152.

The reference voltage for the slicer circuit 146 is a function of the bandwidth selector 16. When the selector is at 600 baud the transistor 148 is conducting and the signal to the "—" or inverting input 150 of the operational amplifier 152 is lower than when the selector is set at 1200 baud and the transistor 148 is not conducting.

The output signal 154 (FIG. 12) from the slicer circuit 146 is a square wave signal having the space signal component represented by a direct current voltage level which is more positive than the voltage level of the mark signal component. The output signal 154 is supplied to a central processor 12 or similar machine for further processing according to its character.

The transmitter section 10 and the receiver section 14 of a data set has thus been shown and described. The filters in both sections are inductorless multiple feedback active RC filters which provide in addition to the basic filtering function, gain control of the filtered signal. The main element in the active filters is an operational amplifier which allows the capacitor in the feedback circuit of the operational amplifier to function as an inductor. In addition to avoiding the problems associated with inductors in data sets, as bulk, weight, inductive radiation, and loss of signal strength, the active filters of the present invention provide greater circuit stability.

MULTIVIBRATOR TIMING SECTION

Figure 13:
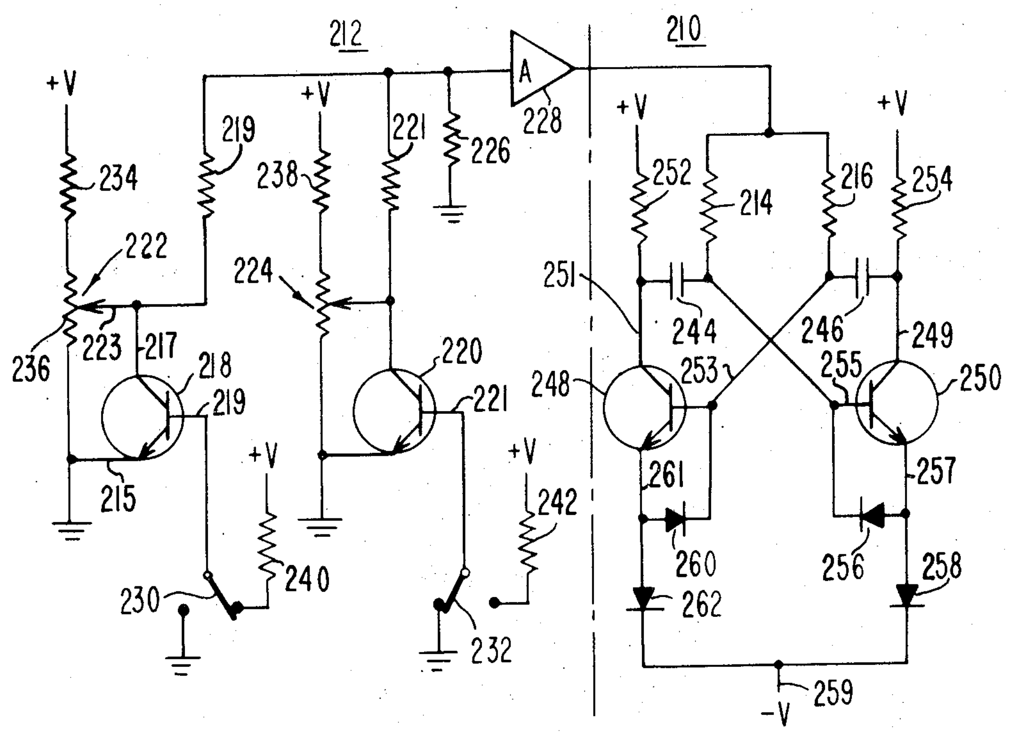
FIG. 13 is a circuit schematic of a voltage controlled multivibrator embodying features of the invention.

The improved multivibrator timing provision hereinabove mentioned is illustrated as a separate sub-system in FIG. 13. Referring to FIG. 13, the circuit of this voltage controlled multivibrator or oscillator 210 including a voltage control circuit 212 is schematically shown. The voltage controlled oscillator 210 is basically an astable multivibrator having the timing resistors 214 and 216 electrically connected to a controlled predetermined variable voltage source. The controlled variable voltage source comprises electrically parallel first and second transistors 218 and 220 having one of their collector resistors 219 and 221 connected in a wye circuit configuration with a fixed resistor 226. For reasons of power drive, the output voltage of the wye circuit is amplified in the amplifier 228 and supplied to the timing resistors 214 and 216.

Electrically connected in the base leads 219 and 221 of the two parallel transistors 218 and 220 are a pair of switches 230 and 232 to control the conduction of their respective transistors. In the circuit shown it is possible to have four different control voltages applied to the timing resistors 214 and 216 of the oscillator 210.

Referring to the voltage control section, the collector circuit of the first transistor 218 comprises a current limiting resistor 234 for circuit protection and a potentiometer 222 for voltage adjustment of the wye circuit. The emitter lead 215 of the first transistor 218 is electrically connected to ground and the collector lead 217 is electrically connected to the wiper arm 223 on the potentiometer 222. Thus, when the first transistor 218 is conducting, the wiper arm 223 on the potentiometer 222 is essentially at ground potential, thereby shorting out one portion 236 of the potentiometer 222. The second transistor 220, current limiting resistor 238 and potentiometer 224 function in the same manner as described above in connection with the first transistor 218.

When the first switch 230 and second switch 232 are off which is represented by electrically connecting the base leads 219 and 221 to a source of voltage through the resistors 240 and 242, neither the first nor the second transistor 218 or 220 is conducting and the voltage to amplifier 228 is at a first potential. When the first switch 230 is on and the second switch 232 is off, as illustrated in FIG. 13, the voltage to the amplifier 228 is at a second potential which is lower than the first potential. The third potential, which is lower than the second potential occurs when the first switch 230 is off and the second switch 232 is on. When both switches 230 and 232 are on, the lowest or fourth potential which is essentially ground is present at the amplifier 228.

The output of the amplifier 228 of the preferred embodiment which is in phase with its input but at a higher potential, is supplied to one end of each of the timing resistors 214 and 216 of the oscillator 210. The other end of the first timing resistor 214 is electrically connected to one end of a first voltage-current storage member or first timing capacitor 244 and to the base lead 255 of the first oscillator transistor 250. The other end of the second timing resistor 216 is electrically connected to one end of a second voltage-current storage member or second-timing capacitor 246 and to the base lead 253 of the second oscillator transistor 248. The opposite end of the first timing capacitor 244 is electrically connected to the collector lead 251 of the second transistor 248 and the opposite end of the second timing capacitor 246 is electrically connected to the collector lead 249 of the first transistor 250. Also included in the collector circuits of both the first 248 and second 250 transistors are additional resistors 252 and 254 which are electrically connected to a source of potential to provide the voltage swing at the collector.

A first unidirectional transfer member or diode 256 is electrically connected in parallel circuit to the base emitter circuit of the first transistor 250. The cathode of the diode 256 is electrically connected to the base lead 255 of the first transistor 250 and the anode of the diode 256 is electrically connected to the emitter lead 257 of the first transistor 250. A second unidirectional current conducting member or diode 258 is electrically connected in the emitter circuit of the first transistor 250 between the emitter lead 257 and a source 259 of negative potential. In a similar manner, a first diode 260 is electrically connected in parallel circuit to the base-emitter circuit of the second transistor 248 and another second diode 262 is electrically connected in the emitter circuit of the second transistor 248 between the source 259 of negative potential and the emitter lead 261.

OPERATION

Figures 14, 15, 16, 17:
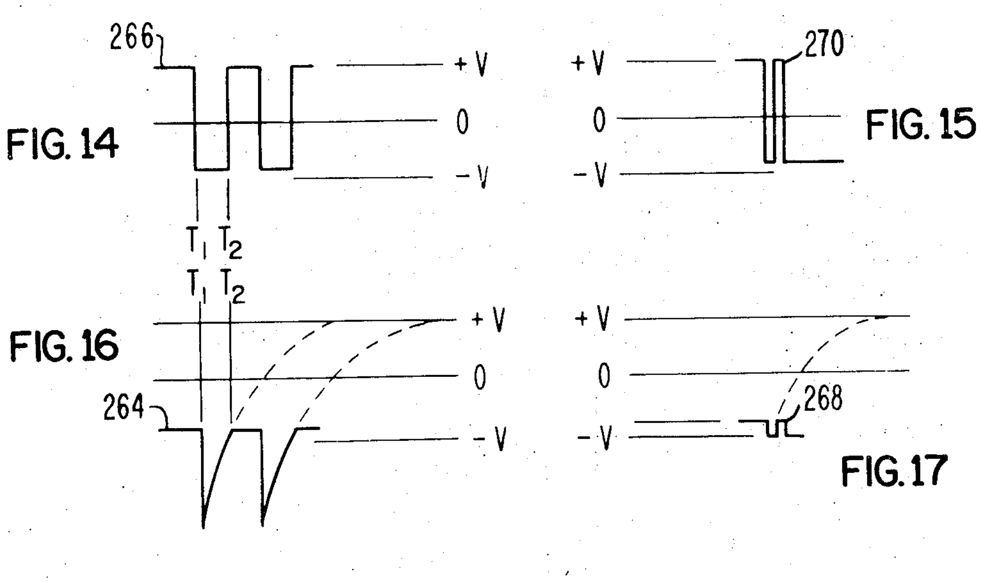
FIG. 14 is a view illustrating the voltage waveshape of the multivibrator.
FIG. 15 is a voltage waveshape illustration similar to FIG. 14.
FIG. 16 is a view illustrating the voltage waveshape at the base of each transistor in FIG. 13.
FIG. 17 is a voltage waveshape illustration similar to FIG. 16 without the improvement therein.

For the purpose of illustration, consider that the first transistor 250 is in conduction, that V equals 7 volts, and −V is a negative 7 volts. Immediately preceding the point of time when the first transistor 250 begins to conduct, the voltage at the junction of the second timing capacitor 246 and the collector resistor 254 is approximately plus 7 volts. The base voltage of the second transistor 248 is approximately minus 6 volts because the second transistor 248 is conducting. Therefore, the voltage across the second timing capacitor 246 is 13 volts or approximately equal to the absolute value summation of the two sources of voltage potential. This is shown in FIG. 16 wherein a waveform 264 illustrates the voltage at the base lead 253 of the second transistor 248. The corresponding voltage waveform 266 at the collector lead 249 of the first transistor 250 is shown in FIG. 14.

The first diode 260 at time $T_1$, in FIGS. 14 and 16, is forward biased when the base voltage of the second transistor 248 becomes more negative than minus seven volts due to the discharge of the second timing capacitor 246, the base-emitter junction of the second transistor 248 is not subjected to an inverse voltage exceeding the forward voltage drop of the diode 260. At this time the second diode 262 is reversed biased by the voltage discharge pulse of the second timing capacitor 246 and the amplitude of the discharge pulse is not reduced by being clamped to a fixed potential. As previously indicated the voltage value of the discharge pulse is 13 volts and the unreduced amplitude of the voltage peak is therefore at minus 19 volts.

As illustrated in FIG. 16, the second timing capacitor 246 begins to charge from a voltage of approximately minus 19 volts to the positive supply voltage of plus seven volts through the second timing resistor 216. Some time later, at $T_2$, the base 253 of the second transistor 248 becomes more positive than its emitter 261 and the second transistor 248 begins to conduct driving the first transistor 250 out of conduction. This timing sequence is the normal timing operation of a conventional multivibrator.

FIG. 17, is the voltage waveshape 268 representing a clamping condition of the voltage discharge pulse which would be found at the base 253 of the second transistor 248 if the second diode 262 was omitted. For the purposes of illustration, the values of timing resistor 216 and and timing capacitor 246 remain the same, therefore the output voltage waveshape 270 shown in FIG. 15, would be substantially increased in frequency, because the anode of the diode 260 is electrically clamped to the minus voltage supply 259.

If in FIG. 13 the first diode 260 was omitted, the full voltage swing due to the discharge of the second timing capacitor 246 would appear as an inverse voltage across the base emitter junction of the second transistor 248. The magnitude of this voltage would cause the base-emitter junction to break down and the transistor would fail. The doping levels, which are necessary in switching transistors are such that the requirement of a low voltage drop between the collector and emitter during conduction will not sustain an appreciable amount of inverse voltage.

The first diode 260 is electrically connected in parallel to the base-emitter junction of the second transistor 248 and does not conduct when the transistor is conducting but does provide a transfer path to the large voltage swing due to the discharge of the second timing capacitor 246. The second diode 262 acts in combination with both the second transistor 248 and the first diode 260 to provide a low resistance path when the second transistor 248 conducts but an extremely high resistance path when the second timing capacitor 246 discharges to dissipate the voltage discharge pulse.

In a similar manner as described above in connection with the second transistor 248, when action of the other first diode 256, the other second diode 258 and the first transistor 250 cooperate to produce a desired output pulse.

There has been shown and described a multivibrator timing system such as used in the voltage controlled oscillator of the invention. The systems comprise a first diode electrically connected in parallel circuit to the base-emitter junction of one of the multivibrator switching transistors and a second diode electrically connected in series circuit with the emitter of the switching transistor. The first diode is electrically connected to conduct inversely from the base-emitter junction of the switching transistor. The second diode is electrically connected to conduct when the base emitter junction of the switching transistor conducts and to dissipate the voltage discharge pulse of the timing capacitor without an amplitude reduction. This structure allows the use of higher timing voltages and physically smaller timing components in the timing circuits of such multivibrator and improves the stability of the data set system and consequently relaxes the design criteria for the active filters disclosed herein.

What I claim is:

1. A full duplex data set comprising:

transmission means for converting binary encoded direct current level data signals into frequency modulated signals for transmission over a telephone network;

receiver means for converting the frequency modulated signals received from the telephone network into direct current level data signals according to the frequency of said received signals;

transformer means operatively included in the circuit of said transmission means and separate transformer means operatively included in the circuit of said receiver means and each being operable to connect the circuit with which it is associated to a telephone network for respectively transmitting and receiving frequency modulated signals, bandwidth control means operatively connected to said transmission means and to said receiver means for selecting the frequency range of the signals on the telephone network within the predetermined transmission capabilities of the data set and the telephone network, said bandwidth control means including switch means for providing a plurality of selectable voltage levels for differentiating between mark and space signals according to the selected frequency range, filter means operatively connected to the transformer means included in said transmission means and separate filter means operatively connected to the transformer means included in said receiver means, each said filter means being an inductorless multiple feedback active RC filter having an operational amplifier as the active element therein, and the circuit of said receiver means having a further filter means including a pair of series connected inductorless multiple feedback low pass active RC filters each having an operational amplifier as the active element therein and a frequency rejection filter electrically connected in series with said pair of RC filters for rejecting the second harmonic frequency component of the mark frequency.

2. In a duplex data set according to claim 1 wherein said transmission means comprises:

an oscillator operable to generate dual frequency, frequency modulated signals wherein a first frequency is representative of the binary one value of the data signals and a second frequency is representative of the binary zero value of the data signals;

oscillator control means adapted to receive binary encoded direct current level data signals and operable to control the frequency of said oscillator according to said signals;

means for dividing the frequency of the oscillator output by an integer greater than one; and means for cutting off the operation of the oscillator on a predetermined phase level of the signals generated thereby.

3. In a data set according to claim 2 wherein said frequency dividing means is a flip flop, and said oscillator cut-off means includes gating means responsive to the concurrent receipt of a disabling signal and a signal at said predetermined phase level.

4. A data set including, in combination:

receiver means for converting the frequency modulated signals received from a telephone network into direct current level data signals according to the frequency of said received signals;

transformer means operatively included in the circuit of said receiver means and being operable to connect the same to a telephone network for receiving frequency modulated signals;

bandwidth control means operatively connected to said receiver means for selecting the frequency range of the signals on the telephone network within the predetermined transmission capabilities of the data set and the telephone network, said bandwidth control means including switch means for providing a plurality of selectable voltage levels for differentiating between mark and space signals according to the selected frequency range;

filter means included in the circuit of said receiver means and operatively connected to the transformer means, said filter means being an inductorless multiple feedback active RC filter having an operational amplifier as the active element therein; and said receiver means having additional filter means in the circuit thereof including a pair of series connected inductorless multiple feedback low pass active RC filters each having an operational amplifier as the active element therein and further having a frequency rejection filter electrically connected in series with said pair of RC filters and cooperating therewith for rejecting the second harmonic frequency component of the mark frequency.

5. A data set including, in combination:

receiver means for converting the frequency modulated signals received from a telephone network into direct current level data signals according to the frequency of said received signals;

transformer means operatively included in the circuit of said receiver means and being operable to connect the same to a telephone network for receiving frequency modulated signals;

bandwidth control means operatively connected to said receiver means for selecting the frequency range of the signals on the telephone network within the predetermined capabilities of the data set and the telephone network, said bandwidth control means including switch means for providing a plurality of selectable voltage levels for differentiating between mark and space signals according to the selected frequency range; and filter means operatively included in the circuit of said receiver means, said filter means including a pair of series connected inductorless multiple feedback low pass active RC filters each having an operational amplifier as the active element therein and a frequency rejection filter electrically connected in series with said pair of active RC filters for rejecting the second harmonic frequency component of the mark frequency.

6. A data set including, in combination:

receiver means for converting the frequency modulated signals received from a telephone network into direct current level data signals according to the frequency of said received signals;

transformer means forming part of the input of said receiver means and being operable to connect the same to the telephone network for receiving frequency modulated signals;

first filter means operatively connected to said transformer means, said first filter means including at least one inductorless multiple feedback active RC filter having an operational amplifier as the active element therein; and second filter means forming part of the output of said receiver means and including a pair of series connected inductorless multiple feedback low pass active RC filters each having an operational amplifier as the active element therein and a frequency rejection filter electrically connected in series with said pair of active RC filters and cooperating therewith for rejecting the second harmonic frequency component of the mark frequency.

7. The data set as defined in claim 6 wherein said first filter means comprises a pair of series connected inductorless multiple feedback active RC filters each having an operational amplifier as the active element therein and of which one is a high pass filter and the other a low pass filter.

* * * * *

UNITED STATES PATENT OFFICE

CERTIFICATE OF CORRECTION

Patent No. 3,793,486 Dated February 19, 1974

Inventor(s) Leo B. Koziol

It is certified that error appears in the above-identified patent and that said Letters Patent are hereby corrected as shown below:

Col. 2, line 6, delete "complex" and substitute therefor --duplex--.

Col. 6, line 39, after "output." and before "In" insert --The threshold is set to the voltage corresponding to the average value of the high and low frequencies and, of course, if the bandwidth is changed one would change the threshold voltage in order to correspond to the average value of the high and low frequencies.--.

Signed and sealed this 11th day of June 1974.

(SEAL)
Attest:

EDWARD M.FLETCHER,JR.
Attesting Officer

C. MARSHALL DANN
Commissioner of Patents

USCOMM-DC 60376-P69
★ U.S. GOVERNMENT PRINTING OFFICE : 1969 O—366-334.